United States Patent

Swanbeck

[15] 3,666,863

[45] May 30, 1972

[54] SKIN-TREATING COMPOSITION AND VEHICLE FOR SKIN-TREATING AGENTS

[72] Inventor: Gunnar P. E. Swanbeck, Vaxholm, Sweden

[73] Assignee: Medisan AB, Uppala, Sweden

[22] Filed: Mar. 4, 1969

[21] Appl. No.: 804,261

[30] Foreign Application Priority Data

Mar. 6, 1968 Sweden..................................2977/68

[52] U.S. Cl..............................424/316, 424/317, 424/319, 424/322
[51] Int. Cl. .......................................................A61k 27/00
[58] Field of Search ..........................424/316, 317, 319, 322

[56] References Cited

UNITED STATES PATENTS 2,118,566  5/1938  Miles.....................................424/317

2,717,850  9/1955  Schmitz................................424/319

OTHER PUBLICATIONS

The Pharmaceutical Recipe Book, (1943) pp. 158, 319
The Dispensatory 25th Edition (1955) pp. 738, 1476
Cosmetic Materials, Harry, (1950) pp. 164, 354– 355
Cotte et al., American Perfumer & Cosmetics (1967) Vol. 82, No. 4 pp. 47– 50, 52, 55– 58

*Primary Examiner*—Albert T. Meyers
*Assistant Examiner*—Norman A. Drezin
*Attorney*—Hubbell, Cohen & Stiefel

[57] ABSTRACT

The present invention relates to a skin-treating composition comprising an aqueous phase in which urea and lactic acid are dissolved. Optionally, the composition of the invention may comprise a lipid phase, wetting or emulsifying agents and amino acids. The composition is per se beneficial for the treatment of certain abnormal skin conditions; it is also an excellent vehicle for therapeutically active drugs for the treatment of pathological skin conditions.

13 Claims, No Drawings

SKIN-TREATING COMPOSITION AND VEHICLE FOR SKIN-TREATING AGENTS

DESCRIPTION OF THE INVENTION

The essential property of the new skin-treating composition is that it exerts a softening action on the corneous layers of the skin and favors the normal release of corneous cells. The corneous layers of the skin on the hands often become dry and rough during the winter which is also true about housewives whose hands come into contact with water-containing washing agents. Such changes of the properties of skin may be regarded as slight deviations from the normal and not as skin diseases and the composition according to the invention may be regarded as a cosmetical product when used for the healing of such skin conditions.

However, there are also a number of skin diseases which cause pathological changes of the properties of the corneous layers of the skin. Examples of such diseases are for instance the following: Ichthyosis, psoriasis and atopical eczema. The novel composition according to the invention exerts a beneficial action also on such pathological changes. The composition can be used as such or as a vehicle for special substances which are specifically active against such skin diseases, such as cortison, hydrocortisone and other steroid compounds, e.g., fluocinolone acetonide and triamcinolone acetonide. The softening action of the new skin-treating composition on the corneous layers of the skin results in more rapid and complete penetration into the skin of the specifically active substances in the composition.

A broader area between cosmetical action and pharmacological action for which the skin-treating composition according to the invention is useful, is the treatment of pimples or blisters of all types, especially acne. The new skin-treating composition can dissolve the plugs which stop up the orifices of the sebaceous glands in persons with a tendency to comedo-formation or acne.

Inasmuch as the new skin-treating composition mainly is used for cosmetical purposes it is also suitable as a carrier for common additives to cosmetical preparations such as perfumes, etc.

The mode of operation of the new skin-treating composition is based on the fact that the normal corneous layers of skin contain a certain amount of hygroscopical substances such as urea, lactic acid and certain amino acids, whereas the thickened, hardened or pathologically changed corneous layers of skin contain a considerably lesser amount of such hygroscopical substances.

The use of urea as a skin-treating agent to soften thickened and hardened corneous layers of the skin has been suggested previously. Urea has been used both in an aqueous solution or in the form of a cream (emulsion of the oil-in-water type) but such use possesses certain disadvantages due to the instability of urea which readily decomposes in aqueous solution to form carbon dioxide and ammonia. When a urea-containing cream is used such a decomposition results in a phase separation which means that such an urea-containing cream is not durable.

The skin-treating composition or vehicle for skin-treating agents according to the invention contains as obligatory components urea and lactic acid in an aqueous solution. No salt formation in the real sense of the word occurs between urea and lactic acid. The basic character of urea is too weak for such a salt formation. In spite of that it may be presumed that a chemical or a complex-forming reaction occurs between the two components since the pH value of a solution containing urea and lactic acid is always somewhat higher than the calculated pH value presuming that the two components do not react with each other.

In many cases the new composition is used without a lipid phase, e.g. in moist bandages. It is also possible to prepare fabrics impregnated with an aqueous solution containing urea and lactic acid in advance and pack the fabrics in sealed packages so that no moisture will evaporate.

The new composition can also be used in the form of aerosols, especially foam aerosols.

It is especially suitable to use the new composition in the form of ointments, creams or emulsions in which case the composition contains greater or lesser amounts of a lipid substance as a disperse phase. Especially in the form of an ointment or a cream the skin-treating composition according to the invention can be applied by the consumer himself on the surfaces to be treated. However, as has been pointed out above, the lipid phase is not essential but rather is an optional component in the skin-treating composition of the invention.

Further optional components in the new skin-treating composition are the following:

a. Amino acids derivatives of amino acids, including mixtures thereof occurring in the corneous layers of the skin such as glycine, serine, ornithine, citrulline, arginine and especially betaine;

b. surface-active substances (emulsifiers) which above all are suitable to use when the skin-treating composition contains a disperse lipid phase.

Regarding the different essential and optional components of the new skin-treating composition the following may be stated.

The urea content may be about 2 – 30 percent by weight but suitably about 5 – 12 percent and preferably about 8 – 10 percent. The percentage is calculated on the total composition, with the higher urea contents being especially intended for such skin-treating compositions which do not contain a lipid phase, whereas the urea content of an ointment or cream usually generally is not above about 12 percent.

The lactic acid content in the skin-treating composition according to the invention is about 0.5 – 8 percent by weight, preferably about 2 – 6 percent, based on the total composition.

Also as regards the lactic acid content the higher percentages are primarily intended for skin-treating compositions without a lipid phase. The lactic acid percentages are also calculated on the total composition.

As regards lactic acid ($\alpha$-hydroxypropionic acid), the racemate may be used but also l-lactic acid obtained by fermentation. However, it is also possible to use the more scarce d-lactic acid.

As has been stated above, the skin-treating composition according to the invention may contain a lipid phase but this is not essential. When the skin-treating composition according to the invention contains a lipid phase the aqueous phase is the continuous phase and the lipid phase the disperse phase, i.e. the composition is an emulsion of the oil-in-water type.

As the lipid, saponifiable and also non-saponifiable lipids may be used as well as natural products containing saponifiable and also unsaponifiable lipids, such as for instance wool fat. As the lipid it is also suitable to use hydrocarbons, such as paraffin oil, petrolatum or other petroleum products commonly used in ointments or creams. The amount of the lipid phase is 0 – 50 percent by weight of the total skin-treating composition.

In skin-treating compositions which contain a lipid phase it is suitable to incorporate a surface-active substance (emulsifier). Anionic, cationic and nonionic emulsifiers may be used. The amount of the emulsifier is 1 – 10 % by weight, preferably about 1 – 5 percent, of the total composition and is usually greater in proportion to the lipid phase.

An anionic emulsifier which has given good results is sold under the trademark Amphisol (diethanol amine complex of cetyl phosphate).

Examples of nonionic emulsifiers are fatty acid esters of sorbitan anhydrides or ethylene oxide addition products of sorbitan fatty acid esters such as e.g. Span 80 or Tween 80 or the emulsifiers known under the trademark PLURONICS which are addition products of hydrophilic polyoxyethylene groups and a hydrophobic polyoxypropylene.

However, a content of surface-active substances (emulsifiers) may also be advantageous in such skin-treating compositions which do not contain a lipid phase. With surface-active substances a uniform distribution of the agent on the skin is obtained when the water has evaporated. In a certain degree also the lactic acid promotes the uniform distribution of the urea so that in case of lipid-free skin-treating compositions according to the invention good results may also be obtained without the presence of a surface-active substance.

As stated above the skin-treating compositions according to the invention may be further improved when they contain an amount of such amino acids which are present in a lesser extent in thickened and hardened corneous layers of the skin than in normal corneous layers or derivatives of such acids. Such compounds are above all glycine, serine, ornithine, citrulline, arginine and especially betaine. The amount of such amino acids or derivatives thereof in the skin-treating compositions is about the same or smaller than the amount of lactic acid, i.e., the content thereof may be between 0.05 and 8 percent, preferably 2 – 6 percent.

The skin-treating composition according to the invention may contain most different common additives such as fatty alcohols, hard fats, glyceryl monostearate, isopropyl myristate, propylene glycol, inorganic salts such as sodium chloride, perfume and disinfectants. However, as a rule the addition of disinfectants is unnecessary since skin-treating compositions containing urea and lactic acid retard the growth of a great number of micro-organisms.

As stated above a great advantage of the skin-treating compositions according to the invention is that they greatly decrease the tendency of decomposition of the urea to the formation of carbon dioxide and ammonia due to the lactic acid and the optional further addition of amino acids or derivatives thereof. Further, the resorption of the substances present in the skin-treating composition is considerably increased. An indication of this is that advantageous effects are achieved already with considerably shorter treatment periods but it is also possible to provide this, for instance with the use of components containing $C_{14}$-carbon atoms.

The concentration of urea and lactic acid in the skin-treating composition should be determined in view of the changes in the corneous layers of the skin to be influenced. When aqueous solutions are used the amounts of the treating agents which come into action are relatively small and in such cases it is possible to choose high concentrations of urea and/or lactic acid. The use of ointments or creams containing lipid phases gives the advantage that relatively great amounts of the composition can be brought onto the skin in which case the concentration of urea and/or lactic acid may be smaller.

The invention is further elucidated by the following non-limiting examples.

Example 1.

Lipid phase-free skin-treating composition:

| | | |
|---|---|---|
| Urea | 20 | g. |
| Lactic acid | 3 | g. |
| Sorbitan monooleate = polyethylene addition product (Tween 80) | 2.5 | g. |
| Dilution with water | to 100 | ml. |

Example 2.

Lipid phase-free skin-treating composition:

| | | |
|---|---|---|
| Urea | 20 | g. |
| Lactic acid | 5 | g. |
| Betaine | 5 | g. |
| Sorbitan monooleate = polyethylene addition product (Tween 80) | 2.5 | g. |
| Dilution with water | to 100 | ml. |

Example 3.

Lipid phase-containing skin-treating composition:

| | | |
|---|---|---|
| Urea | 10 | g. |
| Lactic acid | 2 | g. |
| Cetanol (cetyl alcohol) | 15 | g. |
| Wool fat | 15 | g. |
| Metagin (methyl ester of para-oxybenzoic acid) | 0.15 | g. |
| Amphisol (diethanol amine complex of cetyl phosphate) | 2.5 | g. |
| Dilution with water | to 100 | ml. |

Example 4.

Lipid phase-containing treating composition:

| | |
|---|---|
| Urea | 1,000 g. |
| Lactic acid | 500 g. |
| Betaine | 500 g. |
| Sodium chloride | 50 g. |
| Colesterin | 100 g. |
| Hard fat (Witepsol H 15/Martindale, 25. Ed., page 899) | 100 g. |
| Glyceryl monostearate | 1,000 g. |
| Amphisol | 250 g. |
| Distilled water | 6,500 g. |
| | Total 10,000 g. |

Example 5.

Skin-treating composition containing a small amount of lipid phase:

| | |
|---|---|
| Urea | 100 g. |
| Lactic acid | 50 g. |
| Betaine | 50 g. |
| Glyceryl monostearate | 10 g. |
| Cetanol (cetyl alcohol) | 25 g. |
| Isopropyl myristate | 45 g. |
| Amphisol | 10 g. |
| Propylene glycol | 70 g. |
| Perfume | q.s. |
| Dilution with distilled water | to 1,000 g. |

Example 6.

Lipid phase-containing skin-treating composition:

| | |
|---|---|
| Urea | 200 g. |
| Lactic acid | 100 g. |
| Betaine | 100 g. |
| Sodium chloride | 10 g. |
| Cetanol (cetyl alcohol) | 20 g. |
| Hard fat (Witepsol H 15) | 20 g. |
| Vaseline | 200 g. |
| Glyceryl monostearate | 300 g. |
| Sorbitan monooleate (Span 80) | 50 g. |
| Amphisol | 50 g. |
| Distilled water | 950 g. |
| | Total 2,000 g. |

I claim:

1. A skin-treating composition, comprising an aqueous solution of urea and lactic acid, the urea being present in an amount of from about 2 to 30 weight percent, the lactic acid being present in an amount of from about 0.5 to 8 weight percent, each range being based on the weight of solution.

2. The skin-treating composition of claim 1, characterized in that the urea content is from about 5 to 12 weight percent calculated on the total composition.

3. The composition of claim 2 wherein the urea content is from about 8 to 10 weight percent.

4. The skin-treating composition of claim 1, characterized in that the lactic acid content is from about 2 to 6 weight percent.

5. The skin-treating composition of claim 1, which further comprises an amino acid or derivative thereof selected from the group consisting of glycine, serine, ornithine, citrulline, arginine, betaine, and mixtures thereof, present in an amount of from about 0.05 to 8 weight percent of the composition.

6. The composition of claim 5 wherein the amount of amino acids or derivatives thereof is from about 2 to 6 weight percent.

7. The skin-treating composition of claim 1, which further comprises an emulsifier selected from the group consisting of anionic, cationic and nonionic surface-active substances, present in an amount from about 1 to 10 weight percent of the total composition.

8. The composition of claim 7 wherein the amount of said emulsifier is from about 1 to 5 weight percent.

9. The skin-treating composition of claim 1, which further comprises a lipid selected from the group consisting of saponifiable and unsaponifiable lipids and an emulsifier for said lipid selected from the group consisting of anionic, cationic and nonionic surface-active substances, the amount of said lipid being less than about 50 percent by weight based on the weight of the total composition, and the amount of said emulsifier being from about 1 to 10 percent by weight of the total composition.

10. The composition of claim 9, wherein said lipid is selected from the group consisting of wool fat, paraffin oil and petrolatum.

11. The skin-treating composition of claim 9, which further comprises an amino acid or derivative thereof selected from the group consisting of glycine, serine, ornithine, citrulline, arginine, betaine, and mixtures thereof, present in an amount of from about 0.05 to 8 weight percent of the composition.

12. A method of softening relatively hardened layers of skin, comprising applying to the skin a skin-softening amount of a composition comprising an aqueous solution containing about 2 to 30 weight percent urea and about 0.5 to 8 weight percent lactic acid, the ranges being based on the said aqueous solution.

13. A method of softening relatively hardened layers of skin, comprising applying to the skin a skin-softening amount of a composition comprising an aqueous solution containing about 2 to 30 weight percent urea, about 0.5 to 8 weight percent lactic acid and about 0.05 to 8 weight percent of an amino acid or derivative thereof selected from the group consisting of glycine, serine, ornithine, citrulline, arginine, betaine and mixtures thereof, the ranges being based on said aqueous solution.

* * * * *

PO-1050
(5/69)

UNITED STATES PATENT OFFICE
CERTIFICATE OF CORRECTION

Patent No. 3,666,863          Dated May 30, 1972

Inventor(s) GUNNAR P. E. SWANBECK

It is certified that error appears in the above-identified patent and that said Letters Patent are hereby corrected as shown below:

Title Page, Column 2, Line 5 of the Abstract: "composition is per se" should read -- composition, per se is --; Title Page, Column 2, Line 6 of the Abstract: "conditions, it is" should read -- conditions; moreover, it is --. Column 1, line 6: "exerts a softening action" should read -- has a softening effect --; line 9: "winter which" should read -- winter. This --; same line: "about" should read -- for --; line 11: "changes of" should read -- changes in --; same line: "may be" should read -- are --; line 13: "may be" should read -- is --; line 14: "cosmetical" should read -- cosmetic --; line 17: "changes of" should read -- changes in --; line 20: "invention exerts" should read -- invention also exerts --; line 21: "action also on" should read -- action on --; line 22: "special" should read -- other --; line 25: "cortison," should read -- cortisone, --; line 31: "cosmetical" should read -- cosmetic --; line 35: "stop up" should read -- clog --; line 38: "mainly is" should read -- is mainly --; line 39: "cosmetical" should read -- cosmetic --; line 40: "cosmetical" should read -- cosmetic --; line 44: "hygroscopical" should read -- hygroscopic --; line 48: "hygroscopical" should read -- hygroscopic --; line 64: "acid. The" should read -- acid, since the --; line 65: "of that" should read -- of this --. Column 2, line 7: After "cream" a comma (,) should be inserted; line 14: "a. Amino acids derivatives of amino acids, including mix-" should read -- a. Amino acids, derivatives thereof, including mix- --; line 22: "Regarding" should read -- With respect to --; line 26: "suitably about" should read -- suitably is about --; line 28: "contents" should read -- content --; line 31: "usually generally is" should read -- usually is --; line 36: "acid content" should read -- acid content, --; line 40: "As regards" should read -- With regard to the --; line 41: "but also" should read -- as well as --; line 47: "lipid phase" should read -- lipid phase, --; line 66: "trademark Amphisol" should read -- trademark Amphisol ® --;

UNITED STATES PATENT OFFICE
CERTIFICATE OF CORRECTION

Patent No. 3,666,863  Dated May 30, 1972

Inventor(s) GUNNAR P. E. SWANBECK

It is certified that error appears in the above-identified patent and that said Letters Patent are hereby corrected as shown below:

Page 2

Column 2, line 70: "Span 80 or Tween 80" should read -- Span(R) 80 or Tween(R) 80 --; line 71: "PLURONICS" should read -- PLURONICS(R) --; line 74: "However, a content" should read -- The presence --. Column 3, line 3: "In a certain degree" should read -- To a certain extent --; line 4: "also the lactic" should read -- the lactic --; line 8: "stated above" should read -- stated above, --; line 13: "are above all glycine," should read -- are glycine --; line 20: "most different" should read -- most of the different --; line 26: "micro-organisms" should read -- microorganisms --; line 29: "tendence of decomposition of the urea to the for-" should read -- tendency of the urea to decompose to --; line 30: "mation of carbon" should read -- carbon --; line 36: "provide" should read -- prove --; line 42: "are used" should read -- are used, --; line 44: "choose" should read -- use --; line 58: "(Tween 80)" should read -- (Tween(R) 80) --; line 59: "to 100 ml." should read -- to 100 mls. --; line 66: "(Tween 80)" should read -- Tween(R) 80) --; line 67: "to 100 ml." should read -- to 100 mls. --; line 74: "Metagin" should read -- Metagin(R) --.
Column 4, line 1: "Amphisol" should read -- Amphisol(R) --; line 3: "to 100 ml." should read -- to 100 mls. --; line 6: "phase-containing treating" should read -- phase-containing skin-treating --; line 11: "Witepsol" should read -- Witepsol(R) -- line 14: "Amphisol" should read -- Amphisol(R) --; line 25: "Amphisol" should read -- Amphisol(R) --; line 36: "Witepsol" should read -- Witepsol(R) --; line 38: "(Span 80)" should read -- (Span(R) 80) --; line 39: "Amphisol" should read -- Amphisol(R) --.

Signed and sealed this 6th day of March 1973.

(SEAL)
Attest:

EDWARD M. FLETCHER, JR.
Attesting Officer

ROBERT GOTTSCHALK
Commissioner of Patents